OR 3,455,622
X 3015 R
July 15, 1969     G. D. COOPER     3,455,622
LIGHTING DEVICE FOR TRANSMITTING VISIBLE RADIANT ENERGIES
TO INACCESSIBLE PLACES
Filed June 29, 1964     2 Sheets-Sheet 1
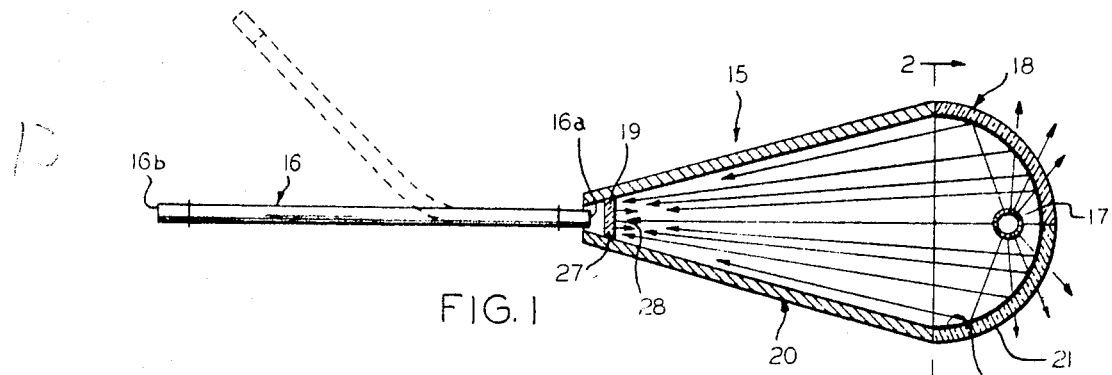
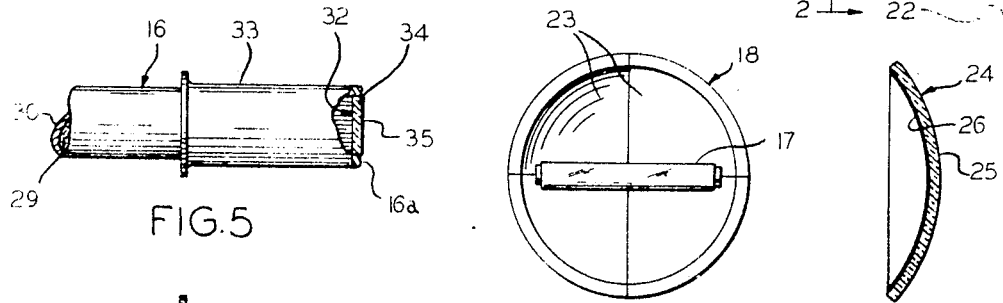
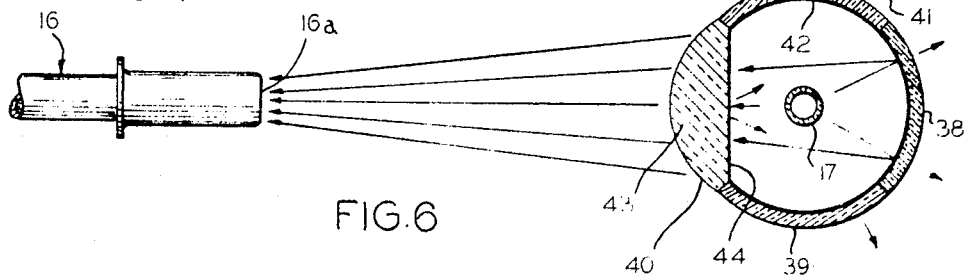
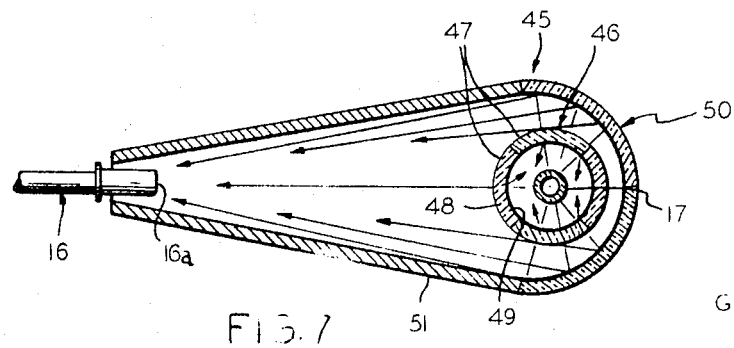
INVENTOR
GEORGE D. COOPER
BY
Marzell, Johnston, Cook + Root
ATTORNEYS

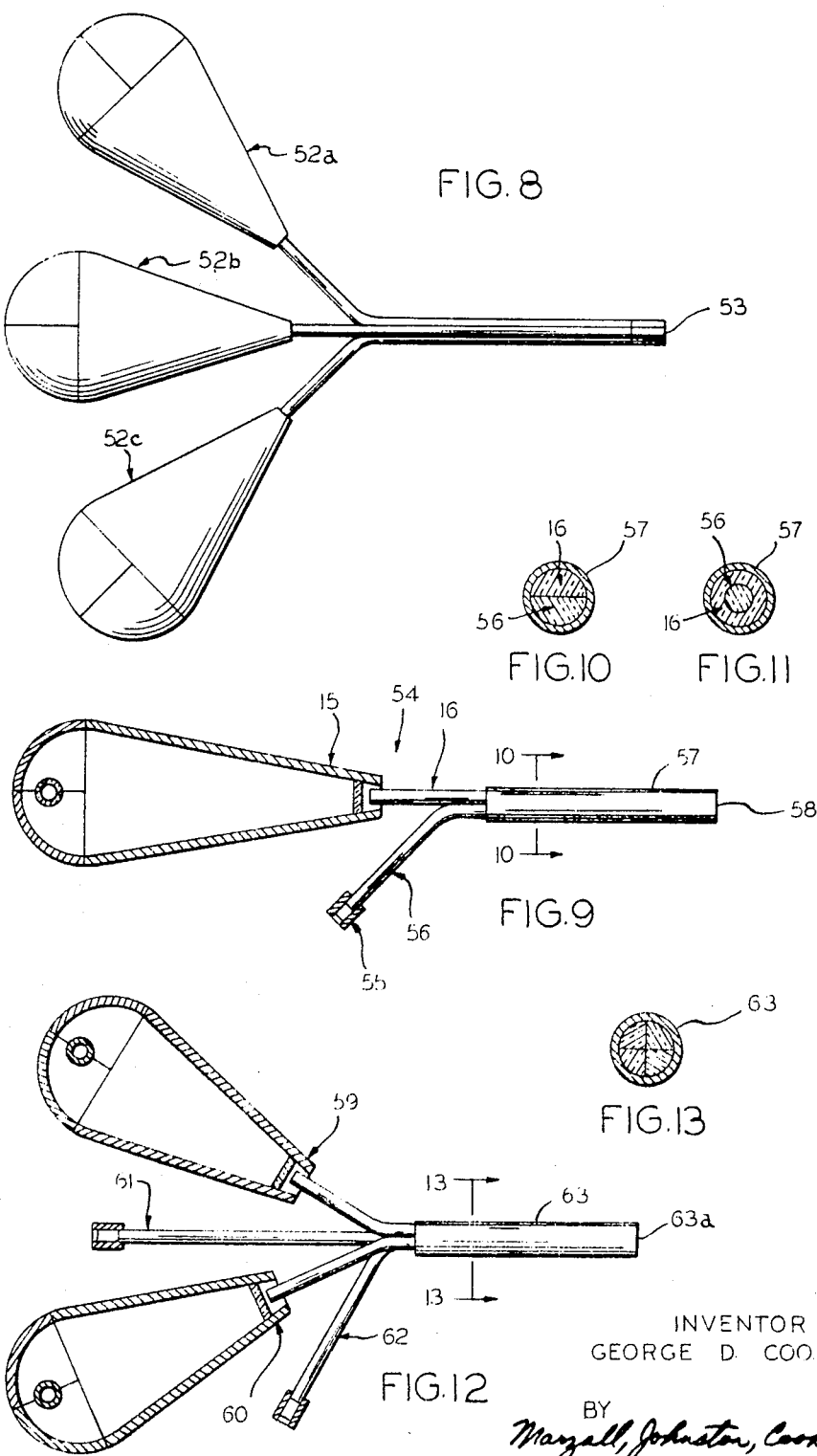

United States Patent Office 3,455,622
Patented July 15, 1969

3,455,622
LIGHTING DEVICE FOR TRANSMITTING VISIBLE
RADIANT ENERGIES TO INACCESSIBLE PLACES
George D. Cooper, 1136 Vista Place,
Edmonds, Wash. 98020
Filed June 29, 1964, Ser. No. 378,674
Int. Cl. G02b 5/20, 13/14, 5/14
U.S. Cl. 350—1
9 Claims

ABSTRACT OF THE DISCLOSURE

Lighting device for transmitting visible radiant energies to inaccessible places including a bundle of flexible optical fibers and means for directing a concentrated column of visible radiant energies into one end of the fibers, which means includes a source of visible and infrared radiant energies and a reflector unit substantially eliminating the infrared radiant energies and providing spectrally balanced visible radiant energies in the concentrated column.

---

This invention relates in general to a lighting device or fixture capable of transmitting light to inaccessible places, and more particularly to a lighting device or fixture including a bundle of optical fibers and a reflector means associated with a source of radiant energies for delivering to one end of the bundle of fibers a relatively pinpoint source of visible radiant energies that are spectrally balanced and susbtantially free of heat.

Heretofore, there have been developed light transmitting devices for handling light energy or visible radiant energies to relatively inaccessible places, but such devices have been limited in application because of incapabilities to deliver visible radiant energies of high intensities having little or no heat and being spectrally balanced or having a suitable color temperature. For example, the well-known endoscope for medical and surgical use which not only functions as an image carrier but usually applies light to the area or subject being viewed must take into consideration the heat normally present in a source of radiant energies which could destroy the living cells of the body. Moreover, the devices heretofore developed have not provided a spectrally balanced source of visible radiant energies, and therefore the colors do not always appear distinctive between adjacent areas. Many other applications require a "heatless" light source and would also prefer a color corrected or spectrally balanced light source.

Therefore, it is an object of the present invention to provide a new and improved device for transmitting light to inaccessible places that obviates the above named difficulties.

Another object of the present invention resides in the provision of a device for transmitting "heatless" and spectrally balanced light energy to inaccessible places.

Still another object of the present invention is in the provision of a device for delivering light energy to inaccessible places which includes a bundle of optical fibers in combination with a source of radiant energies and a reflector system.

Another feature of the present invention is to provide a combination light carrier and image carrier, wherein the combination unit is capable of transmitting "heatless" and spectrally balanced light energy of high intensities to inaccessible places and a viewing device is provided to pick up the image of the area being subjected to the source of light energy.

It is another object of this invention to provide a combination light transmission and image transmission device that is capable of observing greater details by the fact that a spectrally balanced light energy is applied to the area being viewed.

The present invention is further useful to examine interior surfaces of closed machinery and to transmit light energy thereinto. Particularly, light energy may be transmitted into housings of electronic devices, mechanical devices and within hollow building walls. Further, with the combination light transmission and image transmission device inspection may be had within these devices.

Other objects, features and advantages of the invention will be apparent from the following detailed disclosure, taken in conjunction with the accompanying sheets of drawings, wherein like reference numerals refer to like parts, in which:

FIG. 1 is a diagrammatic view of the light transmission device in accordance with the present invention and showing some parts in section for purposes of clarity;

FIG. 2 is a view taken through the reflector system of FIG. 1 substantially along line 2—2 thereof;

FIG. 3 is a modified reflector section that may be employed in the reflector system of FIG. 1 in place of the reflector arranged behind the source of radiant energies;

FIG. 4 is an enlarged fragmentary diagrammatic view with some parts broken away of the end of a bundle of optical fibers and illustrating the application of an infrared reflecting coating on the ends of the fibers;

FIG. 5 is a view similar to FIG. 4 illustrating the use of infrared reflecting coating on a transparent carrier held by the tip of the bundle of optical fibers;

FIG. 6 is a diagrammatic view of another embodiment of the invention illustrating a wraparound reflector system for the source of radiant energy and an optical lense capable of defining a pinpoint source of light energy at the end of the bundle of optical fibers;

FIG. 7 is a diagrammatic and somewhat sectional view of a still further embodiment of the invention wherein the reflector system of FIG. 1 is partially employed together with a wraparound reflector for the source of radiant energies;

FIG. 8 is a diagrammatic view illustrating a plurality of units employed together to still provide higher intensity light energy or to provide light energy of different wavelengths;

FIG. 9 is a diagrammatic view of a combination light carrier and image carrier in accordance with the present invention;

FIG. 10 is a transverse sectional view taken through line 10—10 of FIG. 9;

FIG. 11 is a transverse sectional view illustrating another manner of providing the inclusion of image and light carriers in a single sheath;

FIG. 12 is a diagrammatic view of a further modification of the invention illustrating multiple reflector and viewing devices employed together; and FIG. 13 is a transverse sectional view taken substantially along line 13—13 of FIG. 12 illustrating one manner of arranging the fiber optic bundles in a single unit.

Referring now to the drawings and particularly FIG. 1, a device in accordance with the invention for transmitting light or visible radiant energies to inaccessible places is shown which includes a light producing unit 15 and a fiber optic bundle 16. The fiber optic bundle 16 is flexible as illustrated by the solid and phantom lines so that the outlet end 16b can be easily positioned at any reasonable relative location to the inlet end 16a so as to provide the deliverance of light energy to locations which could not receive light energy emitted in a straight beam from a source.

The light producing unit 15 includes a source of visible and infrared radiant energies 17, a reflector system having a reflector 18 and a reflector 19 for producing the light desired at the inlet end 16a of the fiber optic bundle 16, and a conically shaped shroud or housing 20 extending between the reflector 18 and the inlet end 16a of the fiber optic bundle 16.

The reflector 18 is preferably elliptical or aspheric in shape to provide a relatively pinpoint or concentrated spot source of light or visible radiant energies at the inlet end of the fiber optic bundle. Further, the reflector 18 includes a transparent carrier 21 of glass or other suitable material having a coating 22 on either side thereof although shown on the inside in FIG. 1 for reflecting spectrally balanced visible radiant energies and transmitting infrared radiant energies. Essentially, if a color corrected or spectrally balanced light is desired at the inlet end 16a to the fiber optic bundle 16, the coating 22 would be designed to produce such a light. In this instance it is desirable to rid the light column of heat, the infrared radiant energies, and therefore the coating would be designed to transmit infrared radiant energies. If it is desired to have any particular wavelength of light energy at the inlet end of the fiber optic bundle, the coating may be adjusted in design accordingly. For example, if it were desired that a red, blue or yellow light be emitted from the outlet end 16b, of the fiber optic bundle 16, the coating 22 would be designed to handle the particular wavelengths desired.

While any type of coating may be employed, such coatings are usually defined as being dichroics or multi-films that are applied under vacuum. One manufacturer that produces such coatings is the Liberty Mirror Division of Libby-Owens-Ford of Brackenridge, Pa.

Inasmuch as it is difficult and expensive to obtain proper deposition of such a coating on a surface having highly compound curvatures, it should be appreciated that the transparent carrier 21 may be constructed of substantially pie-shaped segments such as designated by the numeral 23 in FIG. 2. If desired, any other shape of segments may be employed.

If desired or practical, a one-piece reflector may be employed such as that indicated in FIG. 3 and designated by the numeral 24, which reflector would take the place of the reflector 18 in the embodiment of FIG. 1. The reflector 24 would also include a transparent carrier 25 having a suitable coating 26 thereon.

The source of radiant energies 17 may take any desirable form and is shown in FIGS. 1 and 2 as an elongated tubular filament or incandescent lamp. Preferably, the lamp may be of the high intensity quartz-iodine lamps presently on the market. It should be appreciated that any other source of radiant energies may be provided such as an arc lamp or a pulsed xenon arc lamp. Further, instead of a line source of radiant energy as would be provided by an elongated tubular quartz-iodine lamp, a lamp providing a point source of radiant energy could be employed.

The reflector 19 may be mounted within the conical housing 20 adjacent to the inlet end 16a of the fiber optic bundle 16. This reflector includes a transparent carrier 27 having a coating 28 on one side thereof, and in this instance on the side facing the source of radiant energy 17. The coating 28 may be of a type like that of the coating 22 but for reflecting the infrared radiant energies that are emitted from the source of radiant energy 17 but not transmitted through the reflector 18. Thus the coating would transmit all radiant energies except the infrared radiant energies or those energies having heat therein. Further, the coating 28 would be compatible with the coating 22 to provide a color corrected light at the inlet end 16a of the fiber optic bundle. While the reflector 19 is shown in position just ahead of the inlet end 16a of the fiber optic bundle, it should be appreciated that it could be placed anywhere in the light column in order to act as a heat barrier and block the transmission of infrared radiant energies to the inlet end of the fiber optic bundle. Further, the surface of the reflector 19 adjacent the inlet end of the fiber optic bundle could be diffused or prismatic to concentrate the light energy into the inlet end 16a of the fiber optic bundle.

The fiber optic bundle 16 may be of any type presently marketed by several manufacturers which is capable of transmitting light or visible radiant energies. For example, the fiber optic bundle 16 would include a multiplicity of flexible fibers 29 made of transparent material and enclosed within a flexible sheath 30. The sheath may be of any suitable material. The term fiber is to be interpreted as including all light-conducting elements that are relatively long and small in cross-sectional area regardless of their cross-sectional configurations. Further, the bundle of fibers 29 may be arranged to have a round cross section in the sheath 30 as shown in FIG. 5 or they may be arranged to have a rectangular cross section. The fibers may be coated or uncoated and formed of glass, plastic or any other suitable material. For transmission of light energies, the bundle of optical fibers 29 need not be oriented and therefore may be referred to as an incoherent bundle, but where it is necessary to transmit an image of an object for viewing purposes, it is necessary that the fibers be oriented, this being defined as a coherent bundle. The inlet and outlet ends of the bundle of fibers are preferably ground and polished, although they may not need to be where the present invention is only concerned with the transmission of light energies.

Referring to the embodiment of FIG. 4, the inlet end 16a of the fiber optic bundle 16 is provided with a coating 31 capable of reflecting the infrared radiant energies and transmitting all other radiant energies. Thus, where this embodiment is employed, the reflector 19 in the embodiment of FIG. 1 may be omitted.

Another modification is shown in FIG. 5 which may be employed in place of the modification of FIG. 4, wherein a reflector 32 of a type similar to reflector 19 is fitted into the tip 33 of the fiber optic bundle 16. This reflector like that of the reflector 19 includes a transparent carrier 34 and a coating 35 of the same type as the coatings 28 and 31.

Referring now to FIG. 6, another embodiment of the invention is shown which includes a wraparound reflector unit 36 that is capable of removing the infrared and color correcting the visible radiant energies while at the same time concentrating the visible radiant energies on the inlet end 16a of the fiber optic bundle 16. This reflector unit includes trough-shaped quarter-segments 37, 38 and 39 and a quarter-segment 40 of optic design. Each of the quarter-segments 37, 38 and 39 includes a transparent carrier 41 having a coating 42, preferably on the side facing the source of radiant energy 17, which coating is capable of reflecting selective wavelengths of visible radiant energies and transmitting infrared radiant energies. The quarter-segment 40 includes a transparent carrier 43 of optical design to concentrate the visible radiant energies reflected from the quarter-segments 37, 38 and 39 and emitted from the source of radiant energy 17 at the inlet end 16a of the fiber optic bundle 16. The surface of the quarter-segment 40 adjacent the source of radiant energy 17 is provided with a coating 44 capable of reflecting the infrared radiant energies and transmitting all other radiant energies. Thus, the visible radiant energies discharged from the reflector unit 36 are essentially free of the infrared radiant energies so as to provide a cool light at the inlet end 16a of the fiber optic bundle. It should be appreciated that the coating 44 would be compatible with the coating 42 on the segments 37, 38 and 39, and that the coatings would produce the visible radiant energies of the selective wavelengths desired.

Another embodiment of the invention is shown in FIG. 7 wherein a reflector unit 45 is employed to produce the color corrected and heatless light energy desired at the inlet end 16a of the fiber optic bundle 16. This reflector unit includes a segmented wraparound reflector 46 having four quarter-segments 47 arranged to define a cylindrical reflector. Each segment is somewhat trough-shaped and includes a transparent carrier 48 having a coating 49 on one side and preferably on the side facing the source of radiant energy 17. This coating 49 is of the same type as the coating 28 on the reflector 19, and the other coatings in the previous embodiments which reflect the infrared radiant energies and transmit all other radiant energies. Further, this coating is additionally capable of providing a color corrected light energy. The visible radiant energies transmitted through the reflector 46 go into the light column and impinge on a reflector 50 which in turn reflects the visible radiant energies toward the inlet end 16a of the fiber optic bundle 16. The reflector 50 could be of any suitable material such as Alzak aluminum, or it could comprise a suitable carrier having a thermally evaporated coating of silver thereon or any other suitable type of reflector. A conically shaped shroud or housing 51 extends between the reflector 50 for purposes of aiding in the directing of the visible radiant energies to the inlet end 16a of the fiber optic bundle. It should be appreciated that the housing or shroud 51 and the comparable element 20 in the embodiment of FIG. 1 may have its inner surface blackened, diffused or specular, depending upon the overall design of the unit.

Referring to FIG. 8, a light transmission unit is shown which includes a plurality of light producing units and associated fiber optic bundles, each of which is designated by the numerals 52a, 52b and 52c. The outlet ends of the fiber optic bundles are arranged together to define a single outlet end 53. A plurality of units would be employed where it was desired to have a light of higher intensity, or where each of the units could be arranged to produce a different range of visible radiant energies. For example, unit 52a might produce a red light while unit 52b would produce a blue light and unit 52c could produce a green light. The outlet end 53 of the fiber optic bundles could either provide pin-point light by being ground and polished or a wide beamed light by being diffused. In either case a controlled or selected field of light could be defined.

FIG. 9 relates to another embodiment of the invention and particularly to a combination light transmission and image viewing device generally indicated by the numeral 54. In this instance, the light transmission unit could be of the type shown in the embodiment of FIG. 1 wherein it would have a light producing unit 15 and a fiber optic bundle 16 associated therewith. The image viewing device includes an eyepiece 55 that may be optically provided with lenses and a fiber optic bundle 56. It should be appreciated that the fiber optic bundle 56 would have the optical fibers oriented and be considered a coherent bundle. The fiber optic bundles 16 and 56 would then be arranged together in a flexible sheath 57 and have an outlet end 58. This unit would permit the transmission of a color corrected and high intensity light to the object being viewed.

The arrangement of the fiber optic bundles 16 and 56 within the sheath 57 may take any desirable form such as the form shown in FIGS. 10 and 11. In FIG. 10, the fiber optic bundle 16 is arranged in a semicircular cross-sectional configuration as is the fiber optic bundle 56 wherein each occupies substantially half of the interior area of the flexible sheath 57. In the embodiment of FIG. 11, the fiber optic bundle 56 is circular in cross section and surrounded by a ring-shaped and cross-sectional fiber optic bundle 16. It would be necessary to maintain the coherent bundle together while the light transmitting bundle of fibers being permissibly incoherent could be arranged as shown around the fiber optic bundle 56. It should further be appreciated that the cross-sectional configuration of the bundles may take any other form if so desired.

The embodiment of FIG. 12 differs from the embodiment of FIG. 9 only in that a plurality of light transmission and image transmission units are arranged together to intensify the light energy produced and to permit observation by more than one person. Particularly, light transmission units 59 and 60 are arranged with image transmission units 61 and 62, wherein all of the fiber optic bundles of these units are held within a single flexible sheath 63 having an outlet end 63a. FIG. 13 illustrates one arrangement of the fiber optic bundles within the flexible sheath 63.

It will be understood that modifications and variations may be effected without departing from the scope of the novel concepts of the present invention.

The invention is hereby claimed as follows:

1. A lighting device for transmitting visible radiant energies to inaccessible places comprising, an elongated flexible sheath, a flexible bundle of optical fibers extending through said sheath, and means for directing a column of visible radiant energies to define a concentrated spot into one end of said bundle of fibers, said means including a dish-shaped reflector having a transparent carrier with a coating thereon for reflecting toward said bundle of fibers spectrally balanced visible radiant energies having a predetermined color temperature and transmitting substantially all infrared radiant energies away from said bundle of fibers, a source of visible and infrared radiant energies, a conically shaped shroud extending between said reflector and said bundle of optical fibers, the larger end of said shroud being at said reflector and mating with the open end thereof, said smaller end of said reflector extending to the inlet end of the bundle of optical fibers, and a transparent carrier in the column of reflected and directly transmitted radiant energies having a coating thereon transmitting the visible radiant energies toward said bundle of fibers and reflecting substantially all of the infrared radiant energies away from said bundle of fibers.

2. The combination as defined in claim 1, wherein said dish-shaped reflector is aspherical.

3. The combination as defined in claim 1, wherein said dish-shaped reflector is parabolic.

4. The combination as defined in claim 1, wherein said dish-shaped reflector includes a plurality of segments fitted together.

5. The combination as defined in claim 1, wherein said dish-shaped reflector is one-piece.

6. The combination as defined in claim 1, wherein the coating on said dish-shaped reflector is on the side facing the source of visible and infrared radiant energies.

7. The combination as defined in claim 1, wherein the coating on said transparent carrier in the column of reflected and directly transmitted radiant energies is on the side facing the source of visible and infrared radiant energies.

8. A lighting device for transmitting visible radiant energies to inaccessible places comprising, an elongated flexible sheath, a flexible bundle of optical fibers extending through said sheath, and means for directing a column of visible radiant energies to define a concentrated spot into one end of said bundle of fibers, a source of visible and infrared radiant energies, said means including a generally cylindrical wraparound reflector surrounding said source, said reflector having a transparent carrier and a coating on one surface thereof for transmitting spectrally balanced visible radiant energies and reflecting substantially all infrared radiant energies, a second reflector behind said wraparound reflector reflecting those radiant energies transmitted from said wraparound reflector and impinging thereon into the column, and a conically shaped shroud extending between said second reflector and said bundle of optical fibers, the larger end of said shroud being at said second reflector and mating with the open end thereof, said smaller end of said shroud extending to the inlet end of the bundle of optical fibers.

9. The combination as defined in claim 1, and a second flexible bundle of optical fibers extending through said sheath, and a viewing means at the inlet end of said second bundle of fibers.

References Cited
UNITED STATES PATENTS 3,327,712   6/1967   Kaufman et al.

JOHN K. CORBIN, Primary Examiner

U.S. Cl. X.R.

240—1; 350—96, 166, 292